United States Patent
Ghosh et al.

(10) Patent No.: US 10,091,717 B2
(45) Date of Patent: Oct. 2, 2018

(54) ENABLING COEXISTENCE BETWEEN WIRELESS NETWORKS AND RADAR SYSTEMS

(71) Applicant: Nokia Corporation, Espoo (FI)

(72) Inventors: Chittabrata Ghosh, Fremont, CA (US); Klaus F. Doppler, Albany, CA (US)

(73) Assignee: Nokia Technologies Oy, Espoo (FI)

( * ) Notice: Subject to any disclaimer, the term of this patent is extended or adjusted under 35 U.S.C. 154(b) by 621 days.

(21) Appl. No.: 14/080,008

(22) Filed: Nov. 14, 2013

(65) Prior Publication Data

US 2015/0131511 A1     May 14, 2015

(51) Int. Cl.
    H04W 48/18     (2009.01)
    H04W 16/14     (2009.01)

(52) U.S. Cl.
    CPC ........... *H04W 48/18* (2013.01); *H04W 16/14* (2013.01)

(58) Field of Classification Search
    CPC .. H04L 5/0062; H04W 72/005; H04W 48/18; H04W 16/14
    See application file for complete search history.

(56) References Cited

U.S. PATENT DOCUMENTS

| | | | | |
|---|---|---|---|---|
| 2008/0106458 A1* | 5/2008 | Honda | ................ | G01S 7/023 342/59 |
| 2010/0019947 A1* | 1/2010 | Kruys | ................ | G01S 7/021 342/20 |
| 2013/0331140 A1* | 12/2013 | Halbauer | ............ | H04W 72/048 455/509 |
| 2014/0080535 A1* | 3/2014 | Gauvreau | ............. | H04W 16/14 455/513 |
| 2015/0009947 A1* | 1/2015 | Rangarajan | ........... | H04L 5/0062 370/330 |

FOREIGN PATENT DOCUMENTS

WO    WO-2005074314 A1    8/2005
WO    WO 2012116868 A1 *   9/2012      ......... H04W 72/048

OTHER PUBLICATIONS

K J et al. *Wifi Alliance the Wifi Alliance Spectrum Sharing in the 5GHz Band DFS Best Practices* Oct. 10, 2007, pp. 1-23 XP55156831.

(Continued)

*Primary Examiner* — Feben Haile
(74) *Attorney, Agent, or Firm* — Harrington & Smith (57) ABSTRACT

A method includes determining information about a radiation pattern of a radar beam that uses a bandwidth. Based on the information, a determination is made whether a channel using at least a portion of the bandwidth is or is not available for access by mobile devices. A transmission is performed to the mobile devices of one or more specific broadcast frames configured to advertise whether the channel is or is not available for access by the mobile devices. Another method includes receiving one or more specific broadcast frames configured to advertise whether a channel is or is not available for access, wherein the channel uses at least a portion of bandwidth used by a radar beam. The channel is or is not accessed based on the one or more specific broadcast frames. The access can be contention-based or contention-free. Apparatus and program products are also disclosed.

17 Claims, 8 Drawing Sheets

(56) References Cited

OTHER PUBLICATIONS

ETSI EN 301 893 V1.7.1 (Jun. 2012) *Broadband Radio Access Networks (BRAN); 5GHz High Performance RLAN; Harmonized EN Covering the Essential Requirements of Article 3.2 of the R&TTE Directive* Jun. 1, 2012, pp. 2012-2016, XP55156936.
"Understanding Channel Assignment", downloaded from http://www.cs.miami.edu/~burt/learning/Csc524.052/notes/wifi.html; Nov. 5, 2013.
"Broadband Radio Access Networks (BRAN); 5 GHz high performance RLAN; Guide to the implementation of Dynamic Frequency Selection (DFS)", ETSI TR 102 651 V1.1.1, Jun. 2009, 23 pgs.
"Broadband radio Access Networks (BRAN); 5 GHz high performance RLAN; Harmonized EN covering the essential requirements of article 3.2 of the R&TTE Directive", ETSI EN 301 893 V1.7.0, Jan. 2012, 90 pgs.
"IEEE Standard for Information technology—Telecommunications and information exchange between systems—Local and metropolitan area networks—Specific requirements—Part 11: Wireless LAN Medium Access Control (MAC) and Physical Layer (PHY) specifications—Amendment 5: Spectrum and Transmit Power Management Extensions in the 5 GHz band in Europe", IEEE Std 802.11h, Oct. 2003, 67 pgs.
Saruthirathanaworakun, R. et al.; "Opportunistic Sharing between Rotating Radar and Cellular"; IEEE Journal on Selected Areas in Communications, vol. 30, No. 10; Nov. 2012;pp. 1900-1910.
Tercero, M. et al.; "Temporal Secondary Access Opportunities for WLAN in Radar Bands"; IEEE 14$^{th}$ International Symposium on Wireless Personal Multimedia Communications (WPMC); Oct. 3, 2011; pp. 1-5.

\* cited by examiner

ENABLING COEXISTENCE BETWEEN WIRELESS NETWORKS AND RADAR SYSTEMS

TECHNICAL FIELD

This invention relates generally to wireless networks and, more specifically, relates to sharing radar bands between wireless networks and radar systems.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below at the end of the specification but prior to the claims.

The coexistence of wireless systems (such as a Wi-Fi system) and radar seems to be forbidden by regulatory requirements, as regulatory requirements deny use of a wireless channel if radar has been detected. However, with the recent Presidential Council of Advisory for Science and Technology (PCAST) report, the military bands (S band) will be unleashed for secondary uses of communications systems (e.g., Wi-Fi and LTE as examples). Based on this report, DARPA has approved a recent project termed as Shared Spectrum Access of Radar Bands by Communications systems (SSPARC).

Military radars typically operate in the so-called S-band (2-4 GHz) and beyond with high transmission power (e.g., 150 KW) using phased array antennae. The radar signals are extremely susceptible to interference from other communications systems, leading to severe degradation in detection performance of target applications.

Meanwhile, with respect to Wi-Fi systems, channel access in Wi-Fi systems is based on contention among active STAs having UL traffic. That is, all Wi-Fi systems are contention-based TDD systems where the access point and the mobile stations all vie for use of the same channel. The traditional method of contention used in Wi-Fi systems is carrier sense multiple access-collision avoidance (CSMA-CA), where a STA needs to sense for an idle channel prior to its transmission. The interframe sensing (IFS) interval and the corresponding back-off method to reduce collisions are typical overheads of any Wi-Fi system.

If Wi-Fi and other wireless systems are to coexist with radar systems, the wireless users will be treated as secondary users and need to impart reduced interference (relative to normal operation) to the radar signals. In the absence of a coexistence mechanism, wireless devices such as STAs in a Wi-Fi system may contend for the channel and access the channel medium when the channel medium is sensed by a STA as being idle. However, during transmissions, if a radar signal appears, the ongoing transmissions will collide with the radar signal, resulting in packet loss of such STAs and other wireless devices. Since the exclusion zone of a radar signal is significant, concurrent transmissions will result in reduced system throughput. Moreover, for the example of STAs, these STAs may assume collisions with other STA transmissions and continue retransmissions with subsequent failure, since STAs are not being informed of radar operation.

In other words, in case coexistence among wireless systems such as LTE or Wi-Fi systems with radars is allowed, a problem is that there are no obvious solutions as to how to guarantee both radar operation and wireless operation in the same or adjacent channels.

SUMMARY

This section contains examples of possible implementations and is not meant to be limiting.

An exemplary method includes determining information about a radiation pattern of a radar beam, wherein the radar beam uses a bandwidth. The method includes determining based on the information about the radiation pattern whether a channel using at least a portion of the bandwidth is or is not available for access by mobile devices. The method includes transmitting to the mobile devices one or more specific broadcast frames by a wireless access node configured to advertise whether the channel is or is not available for access by the mobile devices.

In another exemplary embodiment, an apparatus includes: means for determining information about a radiation pattern of a radar beam, wherein the radar beam uses a bandwidth; means for determining based on the information about the radiation pattern whether a channel using at least a portion of the bandwidth is or is not available for access by mobile devices; and means for transmitting to the mobile devices one or more specific broadcast frames by a wireless access node configured to advertise whether the channel is or is not available for access by the mobile devices.

An exemplary apparatus includes one or more processors and one or more memories including computer program code. The one or more memories and the computer program code are configured to, with the one or more processors, cause the apparatus to perform at least the following: determining information about a radiation pattern of a radar beam, wherein the radar beam uses a bandwidth; determining based on the information about the radiation pattern whether a channel using at least a portion of the bandwidth is or is not available for access by mobile devices; and transmitting to the mobile devices one or more specific broadcast frames by a wireless access node configured to advertise whether the channel is or is not available for access by the mobile devices.

An exemplary computer program product includes a computer-readable storage medium bearing computer program code embodied therein for use with a computer. The computer program code includes: code for determining information about a radiation pattern of a radar beam, wherein the radar beam uses a bandwidth; code for determining based on the information about the radiation pattern whether a channel using at least a portion of the bandwidth is or is not available for access by mobile devices; and code for transmitting to the mobile devices one or more specific broadcast frames by a wireless access node configured to advertise whether the channel is or is not available for access by the mobile devices.

An additional exemplary embodiment includes a computer program, comprising code for determining information about a radiation pattern of a radar beam, wherein the radar beam uses a bandwidth; code for determining based on the information about the radiation pattern whether a channel using at least a portion of the bandwidth is or is not available for access by mobile devices; and code for transmitting to the mobile devices one or more specific broadcast frames by a wireless access node configured to advertise whether the channel is or is not available for access by the mobile devices; when the computer program is run on a processor. The computer program according to this paragraph, wherein the computer program is a computer program product comprising a computer-readable medium bearing computer program code embodied therein for use with a computer.

A further exemplary embodiment is a method that includes determining information about a radiation pattern of a radar beam, wherein the radar beam uses a bandwidth. The method includes determining based on the information about the radiation pattern whether a channel using at least a portion of the bandwidth is or is not available for access by mobile devices. The method further includes transmitting to the mobile devices one or more specific broadcast frames by a wireless access node configured to advertise whether the channel is or is not available for access by the mobile devices.

An additional exemplary embodiment includes a computer program, comprising code for determining information about a radiation pattern of a radar beam, wherein the radar beam uses a bandwidth; code for determining based on the information about the radiation pattern whether a channel using at least a portion of the bandwidth is or is not available for access by mobile devices; and code for transmitting to the mobile devices one or more specific broadcast frames by a wireless access node configured to advertise whether the channel is or is not available for access by the mobile devices.; when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: determining information about a radiation pattern of a radar beam, wherein the radar beam uses a bandwidth; determining based on the information about the radiation pattern whether a channel using at least a portion of the bandwidth is or is not available for access by mobile devices; and transmitting to the mobile devices one or more specific broadcast frames by a wireless access node configured to advertise whether the channel is or is not available for access by the mobile devices.

An exemplary computer program product includes a computer-readable storage medium bearing computer program code embodied therein for use with a computer. The computer program code includes: code for determining information about a radiation pattern of a radar beam, wherein the radar beam uses a bandwidth; code for determining based on the information about the radiation pattern whether a channel using at least a portion of the bandwidth is or is not available for access by mobile devices; and code for transmitting to the mobile devices one or more specific broadcast frames by a wireless access node configured to advertise whether the channel is or is not available for access by the mobile devices.

In a further exemplary embodiment, an apparatus includes: means for determining information about a radiation pattern of a radar beam, wherein the radar beam uses a bandwidth; means for determining based on the information about the radiation pattern whether a channel using at least a portion of the bandwidth is or is not available for access by mobile devices; and means for transmitting to the mobile devices one or more specific broadcast frames by a wireless access node configured to advertise whether the channel is or is not available for access by the mobile devices.

DETAILED DESCRIPTION OF THE DRAWINGS

The description below is provided mainly in terms of Wi-Fi systems coexisting with radar systems. However, the techniques are applicable to any wireless system that coexists with one or more radar systems.

With regard to Wi-Fi systems, in conventional systems using 802.11h, a coexistence mechanism is defined and termed as intermittent DCF for detection of radar in cochannels. Based on this method, the AP defines a fixed schedule for a quiet period, where STAs are prohibited from transmissions and are needed to sense the operating channel for presence of possible radar signals. Typically, every half-beacon interval, such a quiet period is allowed. Between two successive quiet periods, there is a high probability of radar signal occurrence within the Wi-Fi transmission range.

The ETSI and FCC had imposed rules and regulations on emission masks for other secondary devices operating in radar bands. It was required by those regulatory authorities that secondary devices need to sense for radar signals and switch from a channel upon radar detection to a different channel devoid of radar operation. However, due to the recent Presidential Memorandum and PCAST report, exclusivity of spectrum operation is no longer a viable option, thereby encouraging shared spectrum coexistence among radar and secondary communication devices.

As a broad overview, the exemplary embodiments herein provide techniques for such sharing. Exemplary embodiments herein include a coexistence mechanism of channel access for wireless systems such as Wi-Fi systems operating in the same channel(s) as that of an operating radar system.

Exemplary techniques will reduce interference imposed to radar signals operating in the same bandwidth as, e.g., Wi-Fi signals. In order to provide the reduced interference, an exemplary proposal herein is that an AP broadcasts a specific broadcast frame such as a periodic NDP CTS (null data packet clear to send) frame, wherein the period is a function of a shift in beam position by an operating radar system. That is, at every change in beam position of the radar system, the AP broadcasts an NDP CTS frame. Moreover, another exemplary proposal places an additional field in the existing NDP CTS with some new definitions for implicit channel access indications using the existing Duration field in the NDP CTS frame. Similar techniques may be used for other wireless systems, although the specific broadcast frames may be different in those wireless systems.

Information is now presented regarding radar systems suitable for sharing the bandwidth with wireless systems such as Wi-Fi systems. Military radars have fixed locations and transmit with constant power spectral density at any beam position in the searching phase. The radars also possess a fixed beam spacing and fixed rotational patterns of their beams. For each beam position, there will be a fixed interference range for other coexisting communication systems. This range gradually shifts with varying beam position. This application concerns coexistence issues when radars are operating in search mode and the description is not intended to extend to issues when radars are in tracking mode.

Figure 1:
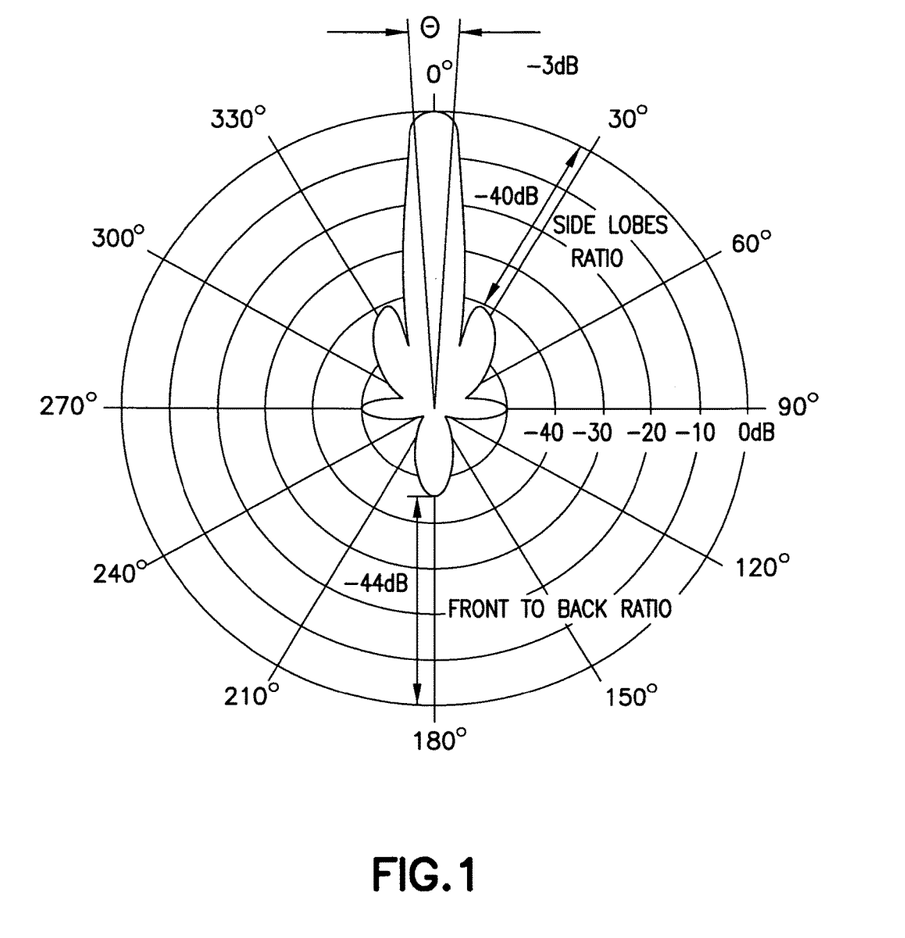
FIG. 1 illustrates an antenna pattern for a radar system in a polar coordinate graph.

Reference is made to FIG. 1, which illustrates an antenna pattern for a radar system in a polar coordinate graph. In FIG. 1, the main lobe has a power of 0 (zero) dB. The side loges (at about a 30 degree angle) have powers of about −40 dB, meaning that the side lobes ratio is −40 dB. The rear lobe has a power of about −44 dB, meaning that the front-to-back ratio is about −44 dB.

Certain exemplary embodiments herein exploit the regular pattern of beam rotations and scanning time at every beam position of radars with electronically steered phased array antennae. Typically, such a radar antenna generates a beam at a specific azimuth angle with fixed beam spacing and beam width. After a fixed number of pulses transmitted in a beam at a fixed azimuth angle, the antenna array shifts the beam to the next pre-defined azimuth angle with fixed beam width. The entire set of beams is generated over the azimuth sector, and the entire process is repeated. Note that the sweep can be from left to right, right to left, top to bottom, or bottom to top. Other examples are possible. Based on the example provided, the following terms are defined:

Beam width: in terms of degrees of azimuth and/or elevation (where elevation is shown) in FIG. 1;

Beam spacing: difference between beam width of two adjacent beams; and

Beam position: any value from one position to many positions.

A duty cycle can indicate how long a beam is active at a particular beam position. Additionally, standoff distance S for radar is the minimum distance permitted by spectrum management processes between the nearest wireless (such as Wi-Fi) node and the nearest radar receiver or transmitter when a wireless network such as a Wi-Fi network and radar operate in the same frequency band, to prevent interference. This standoff distance is computed such that the target range is reduced by not less than five percent and the wireless (Wi-Fi in this example) network aggregate throughput is not less than 95 percent. The standoff distance defines the exclusion zone for a wireless node such as a Wi-Fi node.

Figure 2A:
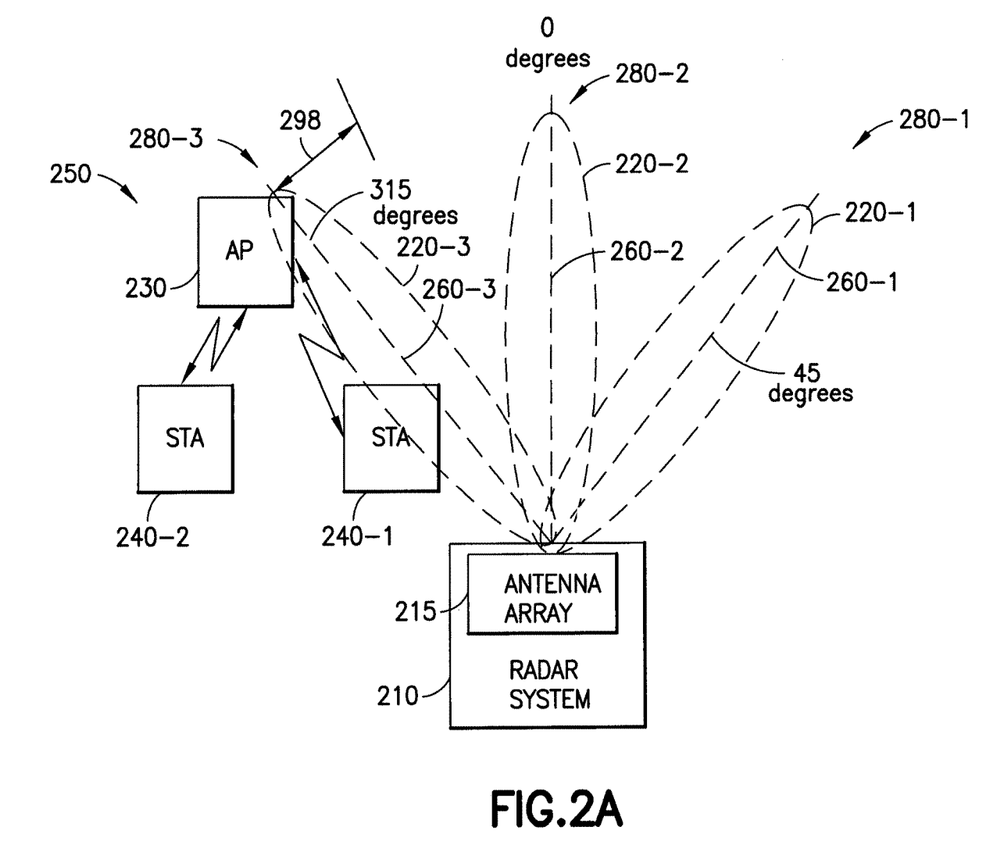
FIG. 2A is an example of a Wi-Fi system and a radar system where a beam caused by the radar system is shown pointing in multiple directions.

Turning to FIG. 2A, FIG. 2A is an example of a wireless system (e.g., a Wi-Fi system) 250 and a radar system 210 where a beam 280 caused by the radar system points may be made to point in multiple directions 260. The beam 280 includes a main lobe 220 and the beam 280 is formed by the antenna array 215 of the radar system 210. For simplicity, only the main lobe 220 of the beam 280 is shown and the side and rear lobes are not shown. The direction 260 of the beam 280 and the main lobe 220 are the same (e.g., the side and rear lobes are ignored for this example). A first position shows the beam 280-1 and its main lobe 220-1 pointing in the direction 260-1 of 45 degrees, a second position shows the beam 280-2 and its main lobe 220-1 pointing in the direction 260-2 of zero degrees, and a third position shows the beam 280-3 and the main lobe 220-3 pointing in the direction 260-3 of 315 degrees. The 45 and 315 degree angles are the exemplary azimuth limits of the main lobe 220. It should be noted that the Wi-Fi system 250 is also called a BSS (Basic Service Set).

In FIG. 2A, the AP 230 and stations (STAs) 240-1, 240-2 should be able to communicate using Wi-Fi resources that overlap with the bandwidth used by the radar system 210, for those directions 260 where the beam 280 is pointed in directions 260 other than at the system 250 (or the directions 260 point some predetermined distance away from the Wi-Fi system 250). At some point as the main lobe 220 nears the 315 degree angle, the system 250 will no longer be able to communicate without error using the bandwidth also used by the radar system 210. Since there are 60 beam positions in the example from above, the Wi-Fi system 250 should be able to communicate using the bandwidth used by the radar system 210 for many of those positions. Reference 298 is an illustration of a standoff distance relative to the Wi-Fi system 250. This example assumes the standoff distance 298 corresponds to an azimuth for the beam 280 of 325 degrees. It is assumed the Wi-Fi system 250 can determine this standoff distance 298. This standoff distance 298 still provides a lot of the rotation of the beam 280 in which the Wi-Fi system 250 may communicate. For instance, if the Wi-Fi system 250 can communicate when the beam is at X of Y positions, then the Wi-Fi system 250 should be able to communicate (at least) for (X/Y)*Z ms of each Z*Y ms.

Figure 2B:
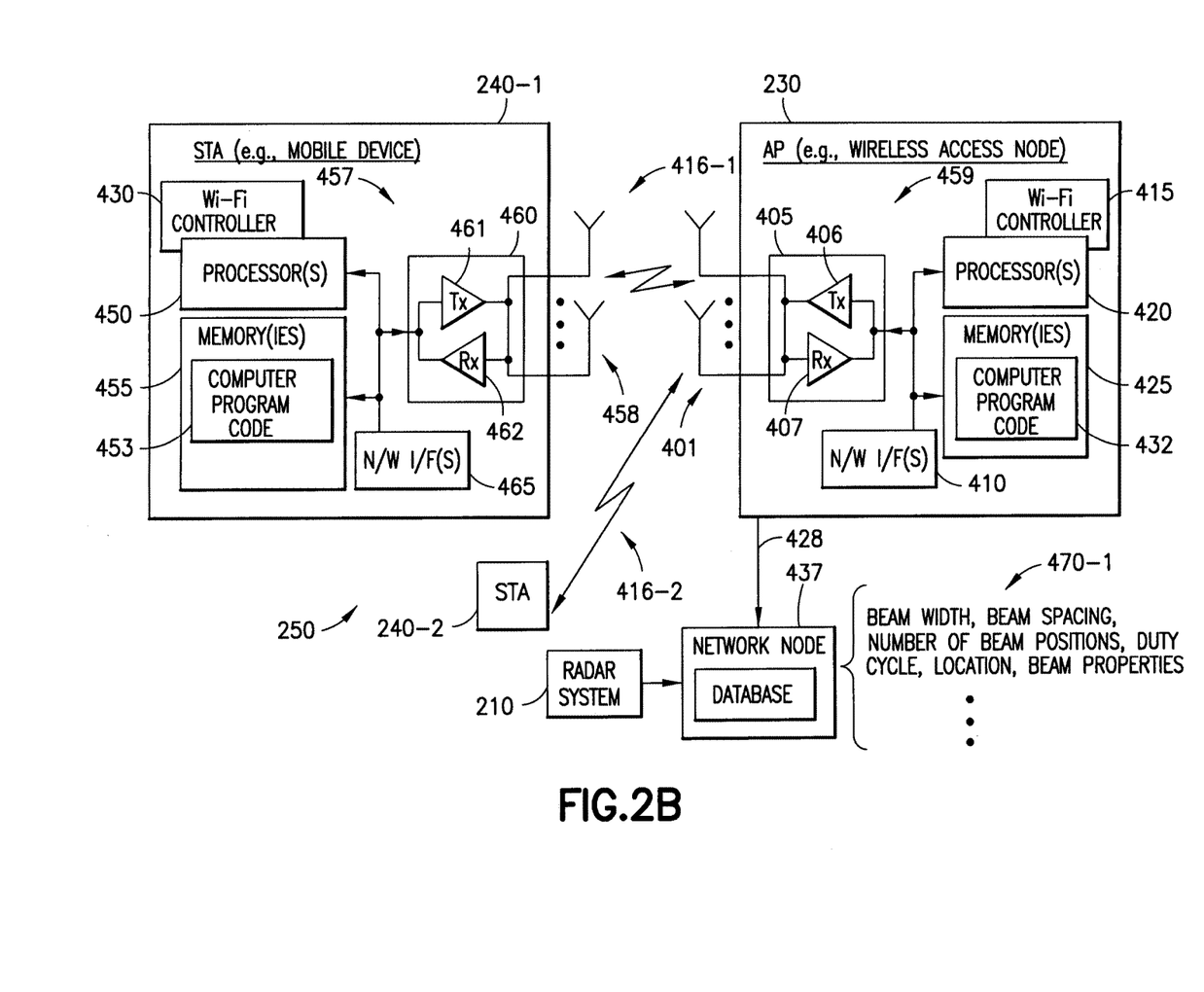
FIG. 2B is a block diagram illustrating possible internal implementations of certain parts of the systems shown in FIG. 2A.

Turning to FIG. 2B, a block diagram is shown illustrating possible internal implementations of certain parts of the system shown in FIG. 2A. In FIG. 2B, two stations (e.g., mobile devices) 240-1 and 240-2 may be in wireless communication with the AP (e.g., a wireless access node providing access to the system 250) 230 via wireless links 416-1 and 416-2, respectively. The two STAs 240-1 and 240-2 are assumed to be similar and only possible internal implementation of the STA 240-1 is described.

The STA 240-1 includes one or more processors 450, one or more memories 455, one or more transceivers 460, and one or more network (NIW) interfaces (I/Fs) 465, interconnected through one or more buses 457. The STA 240-1 includes one or more antennas 458. The one or more memories 455 include computer program code 453. Each of one or more transceivers 460 includes one or more transmitters (Tx) 461 and one or more receivers (Rx) 462. The STA 240-1 includes a Wi-Fi controller 430, which causes the STA 240-1 to perform at least the techniques presented herein. In an exemplary embodiment, the Wi-Fi controller 430 may be implemented (in part or wholly) as computer program code 453, such that the one or more memories 455 and the computer program code 453 are configured, with the one or more processors 450, to cause the STA 240-1 to perform techniques presented herein. In another exemplary embodiment, the Wi-Fi controller 430 may be (in part or wholly) implemented as hardware logic, such as being implemented in an integrated circuit, programmable logic device, or the like. The hardware logic may be part of the one or more processors 450 or separate circuitry. The one or more buses 457 may be any type of connection, such as traces on a motherboard, lines on a semiconductor, fiber optics, wireless connections, and the like.

The AP 230 includes one or more processors 420, one or more memories 425, one or more network interfaces (N/W I/F(s)) 410, and one or more transceivers 405 (each comprising a transmitter, Tx, 406 and a receiver, Rx, 407) interconnected through one or more buses 459. The one or more transceivers are connected to the one more antennas 401. The one or more buses 459 may be any type of connection, such as traces on a motherboard, lines on a semiconductor, fiber optics, wireless connections, and the like. The one or more memories 425 include computer program code 432. The AP 230 includes a Wi-Fi controller 415, which causes the AP 230 to perform at least the techniques presented herein. In an exemplary embodiment, the Wi-Fi controller 415 may be implemented (in part or wholly) as computer program code 432, such that the one or more memories 425 and the computer program code 432 are configured, with the one or more processors 420, to cause the AP 230 to perform techniques presented herein. In another exemplary embodiment, the Wi-Fi controller 415 may be (in part or wholly) implemented as hardware logic, such as being implemented in an integrated circuit, programmable logic device, or the like. The hardware logic may be part of the one or more processors 420 or separate circuitry.

The one or more network interfaces 465, 410 communicate over different types of networks, such as USB (Universal Serial Bus), Bluetooth, or wired LAN as examples. In an example, the AP 230 uses the one or more network interfaces 410 to access a network (such as the Internet) using link 428, where the network node 437 resides on the network. The network node 437 may include a database 438 in certain exemplary embodiments, where the database is able to be written to by the radar system 210 (or by an entity able to determine information about the radar transmissions from the radar system 210). The database 438 is described in more detail below.

The computer readable memories 455, 425 may be of any type suitable to the local technical environment and may be implemented using any suitable data storage technology, such as semiconductor based memory devices, flash memory, magnetic memory devices and systems, optical memory devices and systems, fixed memory and removable memory. The processors 450, 420 may be of any type suitable to the local technical environment, and may include one or more of general purpose computers, special purpose computers, general or special purpose integrated circuits, microprocessors, digital signal processors (DSPs) and processors based on a multi-core processor architecture, as non-limiting examples.

In order to provide communication and corresponding sharing by the Wi-Fi system 250 of the bandwidth used by the radar system 210, an exemplary proposal herein advertises in one or more specific broadcast frames whether the Wi-Fi channel is or is not available for contention-based access. A specific example defines a new field in an NDP CTS frame 300 termed as the "Next NDP CTS Crossing" field 310. See FIG. 3, which shows a proposed NDP CTS frame 300 format. In this example, the following fields 310 are shown: The NDP MAC Frame Type 310-1 (3 bits); Broadcast/Unicast 310-2 (1 bit); RAIPBSSID (Receiver Address/Partial Basic Service Set IDentifier) 310-3 (9 bits); Duration 310-4 (10 bits); Early Selector Indicator 310-5 (1 bit); and Next NDP CTS Crossing 310-6 (1 bit). The Duration field 310-4 is currently used by receiving STAs to set the NAV for the amount of time indicated in the Duration field. In conventional systems, the Duration value of 0 (zero) has no specific meaning.

Figure 3:
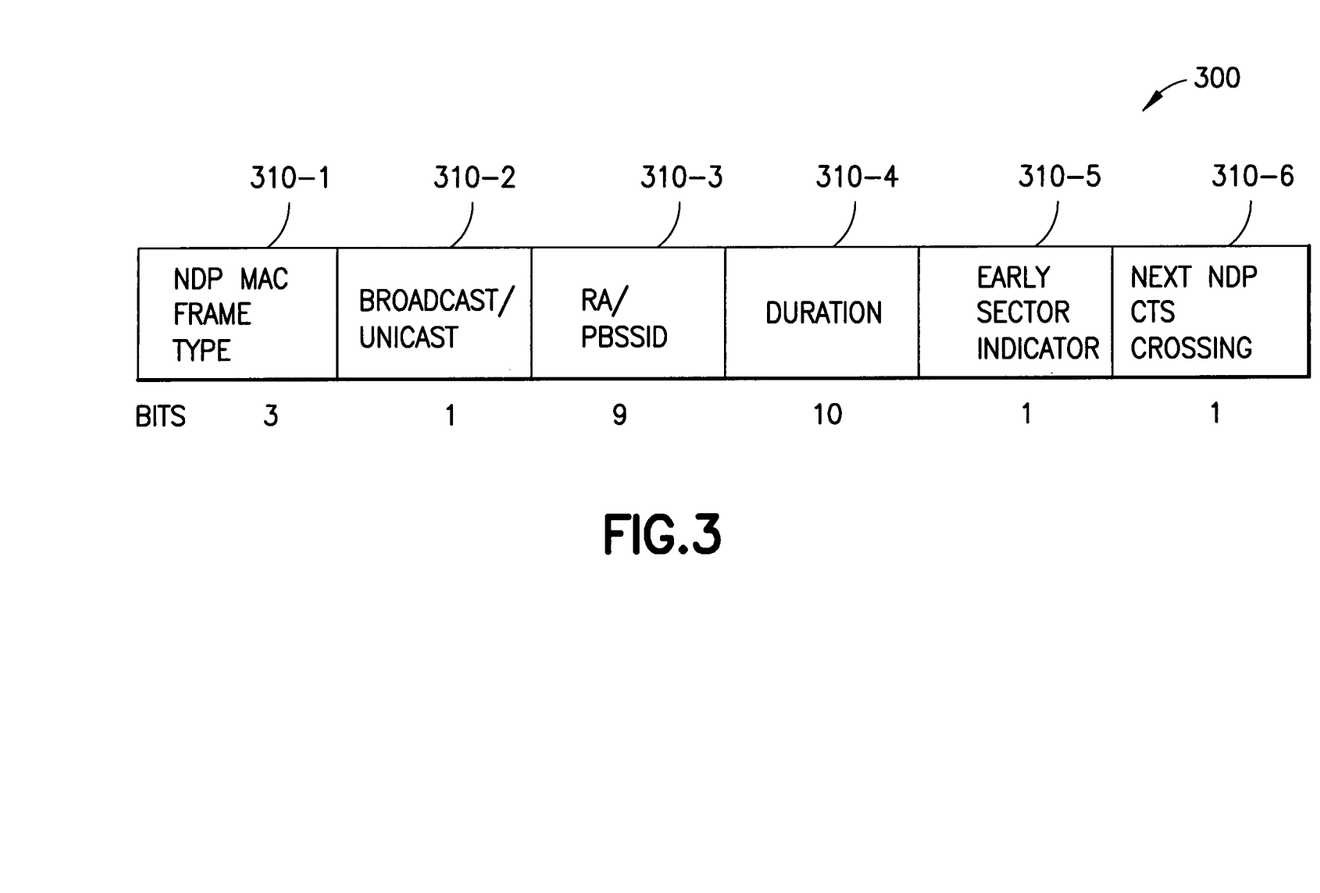
FIG. 3 shows a proposed NDP CTS frame format.

In an exemplary embodiment, the field 310-6 implies whether a STA 240 which gained access to a channel is allowed to transmit data even at the time of the next scheduled NDP CTS frame. If the bit in the field 310-6 is set to 1 (one) (for instance), the STA is allowed to transmit at the time of the next scheduled NDP CTS and the AP 230 waits for the end of the data transmission in order to broadcast the next NDP CTS frame 300.

In an exemplary embodiment, the AP 230 sets this bit in field 310-6 to 0 (zero) (for instance) when the AP 230 determines that the main lobe 220 is approaching the BSS (e.g., the system 250). In order to restrict transmissions when the BSS is aligned with the main lobe 220 at the next scheduled NDP CTS frame transmission time, a STA 240 gaining access to the channel via contention, following the current NDP CTS frame transmission, may be prohibited from having its transmission cross the time of the next scheduled NDP CTS frame.

Moreover, implicit indication of channel access may be controlled by the AP 230 (e.g., alternatively to or in addition to the Next NDP CTS Crossing field 310) the using the Duration field 310-4. A zero value in this field 310-4 indicates to the STAs 240 that the STAs 240 may contend for and access the channel until the next scheduled NDP CTS frame 300. However, a non-zero value in this field 310-4 indicates that STAs shall not contend for the channel for the indicated duration (e.g., in milliseconds). This access prohibition is due to the main lobe alignment with the BSS and no operation shall be allowed for the duration of main lobe alignment with the BSS.

In another exemplary embodiment, it is proposed that the AP 230 periodically broadcasts an NDP CTS frame 300 at every change in beam position of the radar signal. This NDP CTS frame 300 transmission is periodic in nature depending the duration after which a radar system changes its beam position. The STAs 240 after receiving the NDP CTS frame may either contend for the channel and gain access to the medium (e.g., zero value in Duration field) or set a NAV for the indicated duration in the Duration field and freeze their back-off counter if within contention. As is known, in carrier sense-based channel access, a STA senses for idle medium prior to transmission. If the medium is idle, the STA initiates back-off and selects a random number between 0 and 31. When the back-off counter decrements to zero, the STA gains access to the channel. However, during the back-off, if the STA senses the medium to be busy, the STA freezes its counter, i.e., does not decrement its counter from the present value and sets the NAV equivalent to the duration specified in the packet of current transmission for which the STA senses the medium to be busy. The NAV, therefore, is an indicator for a station on how long the STA must defer from accessing the channel.

The AP 230 may obtain the information of beam position from a database (e.g., database 438, see FIG. 2B) that keeps track of radar operation in a wide region. The database 438 in the network node 437 includes a number (typically several or many) of entries 470, of which one exemplary entry 470-1 is shown. In this example, the entry 470-1 includes the following: beam width (as defined above);

beam spacing (as defined above), a number of beam positions (where a beam position is defined above); a duty cycle (e.g., a time period where a radar beam is active at one of the beam positions); a location (e.g., a latitude-longitude location of the radar system 210); and beam properties (e.g., which describe details of the beam). It is expected that the AP synchronizes with the radar beam using the database that provides exact beam position of radar signal. Typical range of a radar beam might be 20 km, directions are typically in azimuth and elevation. Various radars may operate with different values and the items in the entry 470-1 are merely exemplary.

The AP 230 may access the database frequently for timely information to the associated STAs 240 to be broadcasted over the NDP CTS frame 300. The AP 230 may provide the received information about radar operation in Beacon and Probe Response frames. The STAs 240 decode the Beacon or Probe Response frames in order to retrieve the information as well as decode the NDP CTS frame 300 for channel access. Broadly, a STA waking up shall not contend until the STA receives an NDP CTS frame. On receiving an NDP CTS frame, the BSS contends for the channel by initiating back-off. If the Duration field in the NDP CTS frame is set to 0 (zero, as an example), the STAs are not allowed to contend for the channel, thereby prohibiting channel access when the main lobe is aligned with the Wi-Fi BSS. Finally, if a STA 240 wakes up after a scheduled NDP CTS frame 300, the STA 240 shall not transmit a short or long frame until the STA 240 receives the next scheduled NDP CTS frame 240.

Figures 4, 4B:
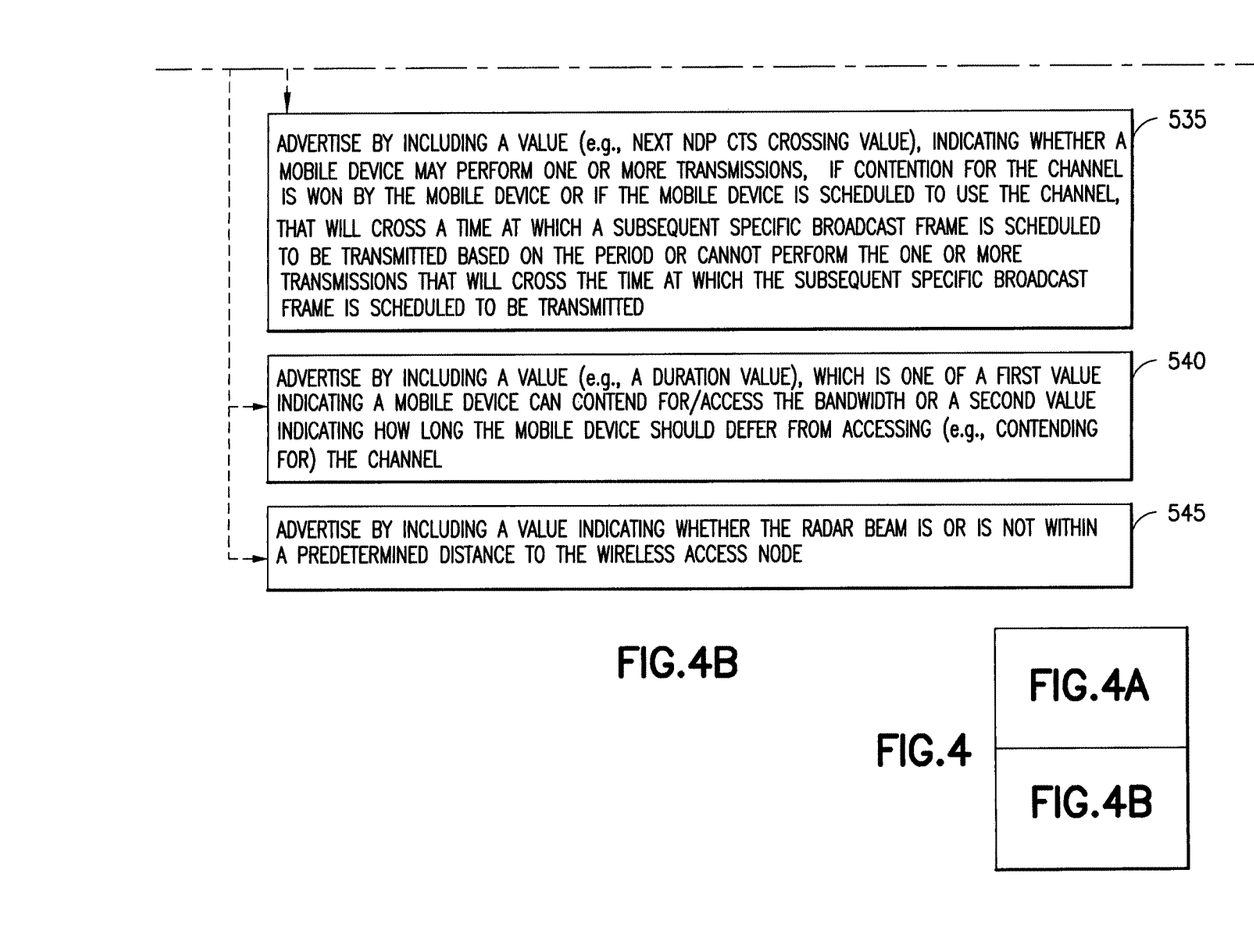
FIG. 4 is a block diagram of an exemplary logic flow diagram performed by an access point for channel access of Wi-Fi in radar bands using specific broadcast frames such as periodic NDP CTS frames, and that illustrates the operation of an exemplary method, a result of execution of computer program instructions embodied on a computer readable memory, and/or functions performed by logic implemented in hardware, in accordance with exemplary embodiments herein.
Figure 4A:
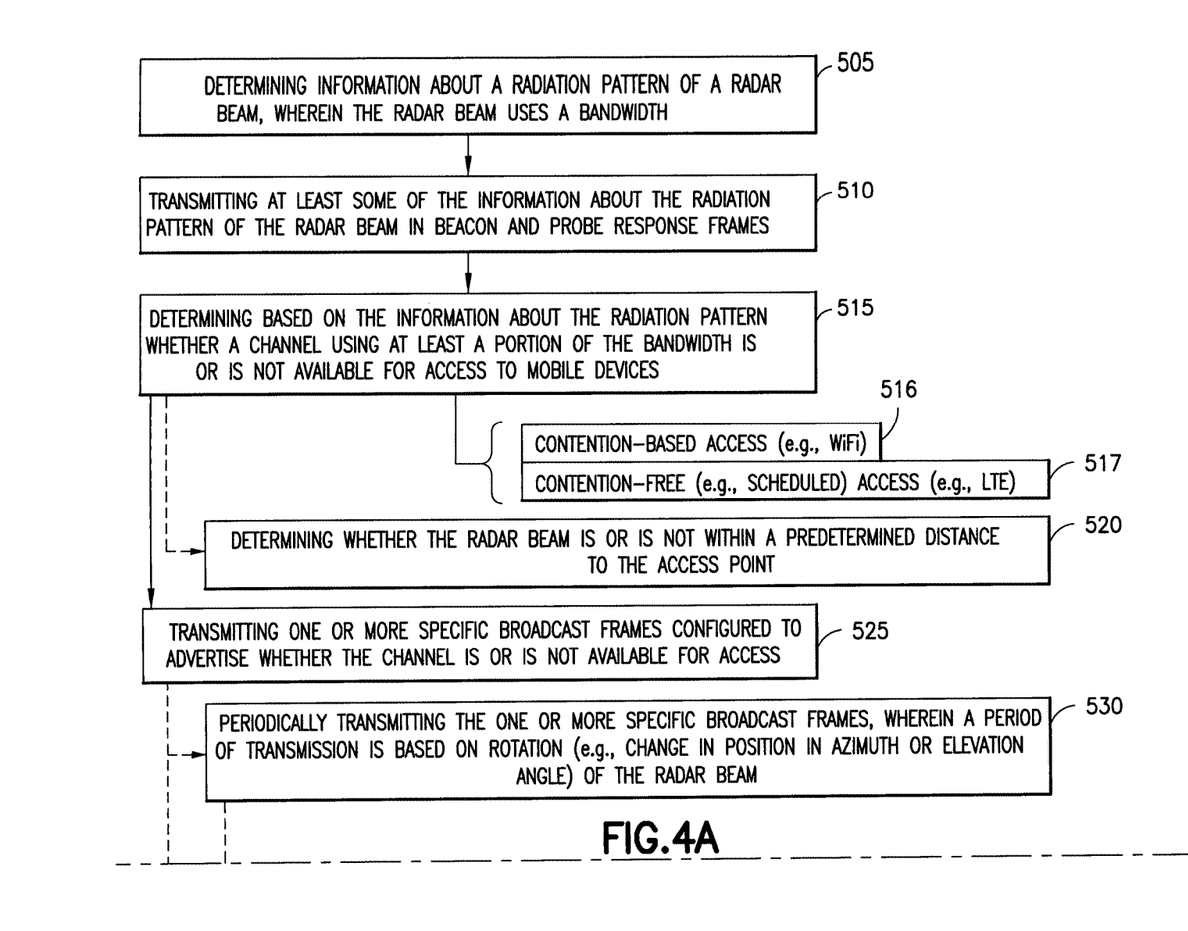

Referring now to FIG. 4, this figure is a block diagram of an exemplary logic flow diagram performed by an access point for channel access of Wi-Fi in radar bands using specific broadcast frames such as periodic NDP CTS frames. FIG. 4 illustrates the operation of an exemplary method, a result of execution of computer program instructions embodied on a computer readable memory, and/or functions performed by logic implemented in hardware, in accordance with exemplary embodiments herein. The blocks in FIG. 4 may also be considered to be interconnected means for performing the functions in the blocks. The blocks in FIG. 4 are assumed to be performed by the AP 230, e.g., under control (at least in part) by the Wi-Fi controller 415.

In block 505, the AP 230 performs the operation of determining information about a pattern of a radar beam. The radar beam uses a bandwidth. As described above, the information may be determined by accessing the database 438 and determining the information in the entries 470. Other options are also possible, such as radar systems 210 (or other entity) could send their information directly to the AP 230. In block 510, the AP 230 performs the operation of transmitting at least some of the information about the pattern of the radar beam in beacon and probe response frames. This information could include information about the periodicity, location of the radar, transmit power, nulls of radar beam, as examples. In block 515, the AP 230 performs the operation of determining based on the information about the pattern whether a channel using at least a portion of the bandwidth is or is not available for access. This determining may be performed based on information from the database 438. For instance, knowing the location of the radar system 210, the length of the beam 280, the orientation of the beam 280, the location of the AP 230, and the like, the AP 230 can use geometry (for instance) to determine when the radar system 210 will affect communication with STAs. For instance, the AP 230 may use this information to determine the standoff distance 298. Furthermore, the AP 230 may also sense for radar operation in addition to collecting information from the database 438 and use the sensing for further refinement of determining when the radar system 210 will affect communication with STAs. The access can be contention-based access 515, which is a primary exemplary embodiment herein. However, the access can be contention-free access 517, such as that performed by LTE, which involves scheduling by a base station (e.g., eNB) of communications by a mobile device (e.g., user equipment).

In block 525, the AP 230 performs the operation of transmitting one or more specific broadcast frames configured to advertise whether the channel is or is not available for access. In contention-based access 516, the advertisement would be an actual "advertisement" in Wi-Fi parlance. In contention-free access 517, the advertisement could be a message or a part thereof sent by a base station to a mobile device.

Block 520 is an example of block 515, and block 545 is an example of block 525. In block 520, the AP 230 performs the operation of determining whether the radar beam is or is not within a predetermined distance to the access point. In block 545, the AP 230 advertises by including a value indicating whether the radar beam is or is not within a predetermined distance to the wireless access node 230 (e.g., access point).

Block 530 is an example of block 525. In block 530, the AP 230 performs the operation of periodically transmitting the one or more specific broadcast frames. The period of transmission is based on rotation (e.g., change in position in azimuth or elevation angle of the radar beam) of the radar beam, as described above. Block 535 is performed based on block 530. In block 535, for contention-based access 516, the AP 230 performs the operation of advertising by including a value such as the Next NDP CTS Crossing value (e.g., in the field 310-6). As stated above, this value indicates whether a mobile device (e.g., STA 240) may perform one or more transmissions, if contention for the channel is won by the mobile device, that will cross a time at which a subsequent specific broadcast frame is scheduled to be transmitted based on the period or cannot perform the one or more transmissions that will cross the time at which the subsequent specific broadcast frame is scheduled to be transmitted. That is, e.g., if the Next NDP CTS Crossing value is one value, the STA 240 should stop transmitting (assuming the STA 240 won contention and is or will be transmitting) before the next NDP CTS frame 300 is scheduled to be transmitted by the AP, wherein the scheduling is based on the period. That is, e.g., if the Next NDP CTS Crossing value is a second value, the STA 240 may continue transmitting (assuming the STA 240 won contention and is transmitting) after the time the next NDP CTS frame 300 is scheduled to be transmitted by the AP. Regarding contention-free access 517, a wireless access device 230 (such as an LTE base station) could provide a value indicating whether a mobile device (e.g., a user equipment) may perform one or more transmissions, if the mobile device is scheduled to access the channel, that will cross a time at which a subsequent specific broadcast frame is scheduled to be transmitted based on the period or cannot perform the one or more transmissions that will cross the time at which the subsequent specific broadcast frame is scheduled to be transmitted.

In block 540, for contention-based access 516, the AP 230 performs the operation of advertising by including the Duration value (in Duration field 310-4 of the NDP CTS frame 300). As described above, the Duration value may be one of a first value indicating a mobile device such as STA 240 can contend for the channel or a second value indicating how long the mobile device should defer from accessing the channel. In an exemplary embodiment, the second value therefore indicates a NAV that should be set by the mobile device. For contention-free access 517, the wireless access node 230 could provide a value that may be one of a first value indicating a mobile device can access the channel or a second value indicating how long the mobile device should defer from accessing the channel. It should be noted that block 540 could also be combined with other blocks, such as blocks 530 and 535.

Figures 5, 5B:
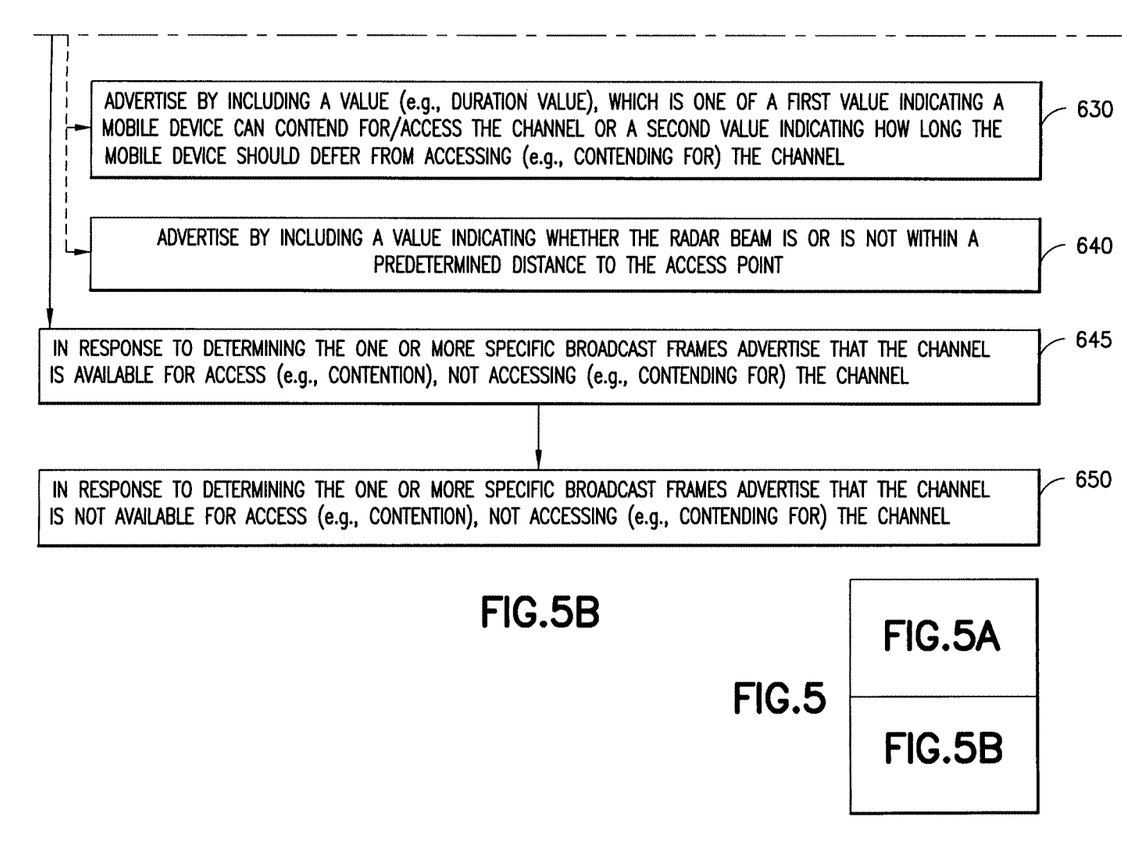
FIG. 5 is a block diagram of an exemplary logic flow diagram performed by a station for channel access of Wi-Fi in radar bands using specific broadcast frames such as periodic NDP CTS frames, and that illustrates the operation of an exemplary method, a result of execution of computer program instructions embodied on a computer readable memory, and/or functions performed by logic implemented in hardware, in accordance with exemplary embodiments herein.
Figure 5A:
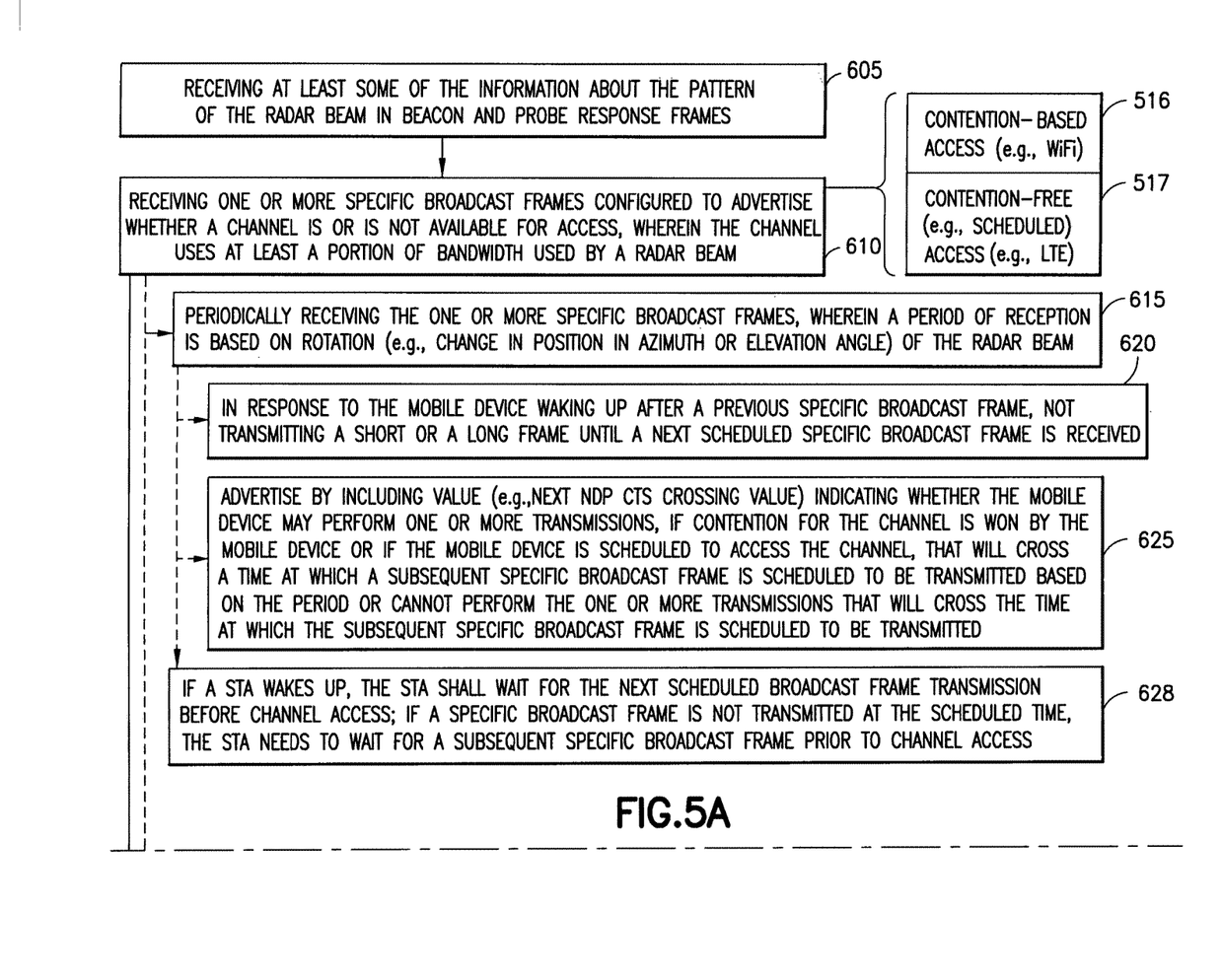

Turning to FIG. 5, this figure is a block diagram of an exemplary logic flow diagram performed by a station for channel access of Wi-Fi in radar bands using specific broadcast frames such as periodic NDP CTS frames. Further, FIG. 5 illustrates the operation of an exemplary method, a result of execution of computer program instructions embodied on a computer readable memory, and/or functions performed by logic implemented in hardware, in accordance with exemplary embodiments herein. The blocks in FIG. 5 may also be considered to be interconnected means for performing the functions in the blocks. The blocks in FIG. 5 are assumed to be performed by the STA 240, e.g., under control (at least in part) by the Wi-Fi controller 430.

In block 605, the STA 240 performs the operation of receiving at least some of the information about the pattern of the radar beam in beacon and probe response frames. This information could include information about the periodicity, location of the radar, transmit power, nulls of radar beam, as examples. The pattern of the radar beam 280 allows the STA 240, for instance, to know when the specific broadcast frames should be received and when the STA can contend for a channel or access a channel. In block 610, the STA 240 performs the operation of receiving one or more specific broadcast frames configured to advertise whether a channel is or is not available for access, which can be a contention-based access 516 or a contention-free access 517. The channel uses at least a portion of bandwidth used by a radar beam. In block 645, the STA 240 performs the operation of, in response to determining the one or more specific broadcast frames advertise that the channel is available for access (e.g., contention), access (e.g., or contending for) the channel. In block 250, the STA 240 performs the operation of, in response to determining the one or more specific broadcast frames advertise that the channel is not available for access (e.g., contention), not accessing (e.g., not contending for) the channel.

Block 615 is an example of block 610. In block 615, the STA 240 performs the operation of periodically receiving the one or more specific broadcast frames, wherein a period of reception is based on rotation (e.g., change in position in azimuth or elevation angle of the radar beam) of the radar beam. Blocks 620, 625, and 628 may be performed based on block 615. In block 620, the STA 240 performs the operation of, in response to the mobile device (e.g., STA 240) waking up after a previous specific broadcast frame, not transmitting a short or a long frame until a next scheduled specific broadcast frame is received. That is, in an exemplary embodiment, the STA 240 wakes up after a previous NDP CTS frame 300. Thus, the STA 240 wakes up between transmissions of the NDP CTS frame 300. The STA 240 therefore does transmit a short or a long frame until a next scheduled specific broadcast frame (e.g., NDP CTS frame 300) is received. In block 625, the advertising occurs by including a value such as a Next NDP CTS Crossing value (in field 310-6). As described above, this value indicates for contention-based access 516 whether the mobile device may perform one or more transmissions, if contention for the channel is won by the mobile device, that will cross a time at which a subsequent specific broadcast frame is scheduled to be transmitted based on the period or cannot perform the one or more transmissions that will cross the time at which the subsequent specific broadcast frame is scheduled to be transmitted. For contention-free access 517, the value may indicate whether the mobile device may perform one or more transmissions, if the mobile device is scheduled to access the channel, that will cross a time at which a subsequent specific broadcast frame is scheduled to be transmitted based on the period or cannot perform the one or more transmissions that will cross the time at which the subsequent specific broadcast frame is scheduled to be transmitted.

In block 628, the STA 240 performs the operation of, if the STA wakes up, the STA shall wait for the next scheduled broadcast frame transmission by the AP and received by the STA before channel access by the STA. If a specific broadcast frame is not transmitted by the AP and received by the STA at the scheduled time, the STA needs to wait for a subsequent specific broadcast frame (e.g., in a next scheduled time as defined by the period) prior to channel access by the STA. The scheduled time is based on the period, as the STA has determined the AP should transmit and the STA should receive the specific broadcast frames based on the period.

In block 630, the advertising occurs by including a value such as the Duration value for a contention-based access 516. As described above, the Duration value (e.g., in the Duration field 310-4 of the NDP CTS frame 300) is one of a first value indicating a mobile device can contend for the channel or a second value indicating how long the mobile device should defer from accessing the channel. The second value could therefore indicate that the NAV should be set by the mobile device. The STA would therefore contend for the bandwidth or set the NAV and act accordingly. For contention-free access 517, the value may be one of a first value indicating a mobile device can access the channel or a second value indicating how long the mobile device should defer from accessing the channel. It is further noted that block 630 may also be performed with blocks 615 and 625 (and 620).

In block 640, the advertising occurs by including a value indicating whether the radar beam is or is not within a predetermined distance to an access point.

As indicated above, blocks 645 and 650 would be selected accordingly for blocks 630 and 640. For instance, block 645 would be performed in response to the first value, indicating the mobile device can contend for the bandwidth, being in the Duration value (block 630) or in response to a value indicating the radar beam is not within the predetermined distance to the access point (block 640). Similarly, block 650 would be performed in response to the second value, indicating a NAV should be set by the mobile device, being in the Duration value (block 630) or in response to a value indicating the radar beam is within the predetermined distance to the access point (block 640).

Although the description above is primarily directed to Wi-Fi, the techniques may be used for other wireless systems. For instance, the examples may be used for LTE systems as described in reference above to the contention-free accesses 517. Transmission and reception herein may be performed through known techniques, such as those described by a number of 802.11 standards or LTE standards.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 2A. A computer-readable medium may comprise a computer-readable storage medium (e.g., memory(ies) 455, 425 or other device) that may be any media or means that can contain or store the instructions for use by or in connection with an instruction execution system, apparatus, or device, such as a computer. However, the computer-readable storage medium dos not encompass propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention.

The following abbreviations that may be found in the specification and/or the drawing figures are defined as follows:
μs microseconds
AP Access Point
BSS Basic Service Set
CSMA-CA Carrier Sense Multiple Access-Collision Avoidance
CTS Clear to send
DARPA Defense Advanced Research Projects Agency
dB decibels
DCF Distributed Coordination Function
ETSI European Telecommunications Standards Institute
FCC Federal Communications Commission
IFS Interframe Sensing
km kilometer
KW kilowatt
LAN Local Area Network
LTE Long Term Evolution
MAC Medium Access Control
ms milliseconds
NAV Network Allocation Vector
NDP Null Data Packet
PCAST Presidential Council of Advisory for Science and Technology
SSPARC Shared Spectrum Access of Radar Bands by Communications
STA Station, a wireless device
TDD Time Division Duplex
UL uplink
Wi-Fi Wireless Fidelity, a wireless local area network (and products) that are based on the Institute of Electrical and Electronics Engineers (IEEE) 802.11 standards
WLAN Wireless Local Area Network.

What is claimed is:

1. A method, comprising:
determining, by a network node, information about an alignment of a main lobe of a radiation pattern of a radar beam with respect to the network node, wherein the radar beam uses a bandwidth, wherein determining the information about the alignment of the main lobe is performed at each position of predetermined positions of the radar beam;
based on the determined information about the alignment of the main lobe of the radiation pattern with respect to the network node, identifying whether a channel using at least a portion of the bandwidth is or is not available for access by mobile devices; and
based on the identifying, transmitting periodically, by the network node, to the mobile devices two or more specific broadcast frames by a wireless access node configured to advertise whether the channel is or is not available for access by the mobile devices, wherein the periodically transmitting the two or more specific broadcast frames is set by the network node to be performed at the predetermined positions of the radar beam, wherein the predetermined positions are based at least on change in position in azimuth or elevation angle of the radar beam, and wherein based on the determined alignment of the main lobe being aligned with the network node at the position of the radar beam, the transmitting the two or more specific broadcast frames to the mobile devices is to advertise that the channel is not available for access by the mobile devices.

2. The method of claim 1, wherein the access is contention-based access, and wherein a current specific broadcast frame is configured to advertise whether the channel is or is not available for access by comprising a value indicating whether a mobile device of the mobile devices may perform one or more transmissions, if contention for the channel is won by the mobile device, that will cross a time at which a subsequent specific broadcast frame is scheduled to be transmitted based on the period or cannot perform the two or more transmissions that will cross the time at which the subsequent specific broadcast frame is scheduled to be transmitted.

3. The method of claim 1, wherein the two or more specific broadcast frames comprise a bit field configured to advertise that the channel is not available for access by the mobile devices during a next scheduled null data packet clear to send frame.

4. A computer program product comprising a non-transitory computer-readable storage medium bearing computer program code embodied therein for use with a computer, the computer program code comprising code executed by a processor to perform the method of claim 1.

5. The method of claim 1, wherein a specific broadcast frame of the two or more specific broadcast frames comprise a duration value indicating how long the mobile devices should defer from accessing the channel.

6. An apparatus, comprising:
one or more processors; and
one or more memories including computer program code, the one or more memories and the computer program code configured, with the one or more processors, to cause the apparatus to perform at least:

determining, information about an alignment of a main lobe of a radiation pattern of a radar beam with respect to the apparatus, wherein the radar beam uses a bandwidth, wherein determining the information about the alignment of the main lobe is performed at each position of predetermined positions of the radar beam;

based on the determined information about the alignment of the main lobe of the radiation pattern with respect to the apparatus, identifying whether a channel using at least a portion of the bandwidth is or is not available for access by mobile devices; and based on the identifying, transmitting periodically to the mobile devices two or more specific broadcast frames by a wireless access node configured to advertise whether the channel is or is not available for access by the mobile devices, wherein the periodically transmitting the two or more specific broadcast frames is set to be performed at the predetermined positions of the radar beam, wherein the predetermined positions are based at least on change in position in azimuth or elevation angle of the radar beam, and wherein based on the determined alignment of the main lobe being aligned with the network node at the position of the radar beam, the transmitting the two or more specific broadcast frames to the mobile devices is to advertise that the channel is not available for access by the mobile devices.

7. The apparatus of claim 6, wherein the access is contention-based access, and wherein a current specific broadcast frame is configured to advertise whether the channel is or is not available for access by comprising a value indicating whether a mobile device of the mobile devices may perform one or more transmissions, if contention for the channel is won by the mobile device, that will cross a time at which a subsequent specific broadcast frame is scheduled to be transmitted based on the period or cannot perform the two or more transmissions that will cross the time at which the subsequent specific broadcast frame is scheduled to be transmitted.

8. The apparatus of claim 6, wherein the one or more memories and the computer program code are further configured, with the one or more processors, to cause the apparatus to perform at least: transmitting at least some of the information about the radiation pattern of the radar beam in beacon and probe response frames.

9. A method, comprising:

periodically receiving from a wireless access node, by a mobile device, two or more specific broadcast frames configured to advertise whether a channel is or is not available for access, wherein the advertise is based on a determined alignment of a main lobe of a radiation pattern of a radar beam with respect to a network node, and wherein the channel uses at least a portion of bandwidth used by a radar beam, and wherein the two or more specific broadcast frames configured to advertise are periodically received at predetermined positions of the radar beam, wherein the predetermined positions are based at least on change in position in azimuth or elevation angle of the radar beam, and wherein the two or more specific broadcast frames are based on whether there is an alignment of the wireless access node with the network node at a position of the radar beam; and in response to the received two or more specific broadcast frames advertising that the channel is available for access, accessing the channel, wherein the advertise that the channel is available is based on there not being the alignment at the position; or in response to the received two or more specific broadcast frames advertising that the channel is not available for access, not accessing the channel, wherein the advertise that the channel is not available is based on there being the alignment at the position.

10. The method of claim 9, wherein:

accessing the channel comprises contending for access to the channel; and not access the channel comprises not contending for access to the channel.

11. The method of claim 9, wherein the access is contention-based access, and wherein the method is performed by a mobile device and wherein a current specific broadcast frame is configured to advertise whether the channel is or is not available for contention-based access by comprising a value indicating whether the mobile device may perform one or more transmissions, if contention for the channel is won by the mobile device, that will cross a time at which a subsequent specific broadcast frame is scheduled to be transmitted based on the period or cannot perform the two or more transmissions that will cross the time at which the subsequent specific broadcast frame is scheduled to be transmitted.

12. The method of claim 9, further comprising receiving information about a pattern of the radar beam in beacon and probe response frames.

13. A computer program product comprising a non-transitory computer-readable storage medium bearing computer program code embodied therein for use with a computer, the computer program code comprising code executed by a processor to perform the method of claim 9.

14. An apparatus, comprising:

one or more processors; and one or more memories including computer program code, the one or more memories and the computer program code configured, with the two or more processors, to cause the apparatus to perform:

periodically receiving from a wireless access node one or more specific broadcast frames configured to advertise whether a channel is or is not available for access, wherein the advertise is based on a determined alignment of a main lobe of a radiation pattern of a radar beam with respect to a network node, and wherein the channel uses at least a portion of bandwidth used by a radar beam, and wherein the two or more specific broadcast frames configured to advertise are periodically received at predetermined positions of the radar beam, wherein the predetermined positions are based at least on change in position in azimuth or elevation angle of the radar beam, and wherein the two or more specific broadcast frames are based on whether there is an alignment of the wireless access node with the network node at a position of the radar beam; and in response to the received one or more specific broadcast frames advertising that the channel is available for access, accessing the channel, wherein the advertise that the channel is available is based on there not being the alignment at the position; or in response to the received one or more specific broadcast frames advertising that channel is not available for access, not accessing the channel, wherein the advertise that the channel is not available is based on there being the alignment at the position.

15. The apparatus of claim 14, wherein:
accessing the channel comprises contending for access to the channel; and
not access the channel comprises not contending for access to the channel.

16. The apparatus of claim 14, wherein the access is contention-based access, wherein the apparatus is a mobile device, and wherein a current specific broadcast frame is configured to advertise whether the channel is or is not available for contention-based access by comprising a value indicating whether the mobile device may perform one or more transmissions, if contention for the channel is won by the mobile device, that will cross a time at which a subsequent specific broadcast frame is scheduled to be transmitted based on the period or cannot perform the two or more transmissions that will cross the time at which the subsequent specific broadcast frame is scheduled to be transmitted.

17. The apparatus of claim 14, wherein the one or more memories and the computer program code are further configured, with the one or more processors, to cause the apparatus to perform at least: receiving information about a pattern of the radar beam in beacon and probe response frames.

\* \* \* \* \*